(12) United States Patent
Bonner et al.

(10) Patent No.: US 7,542,721 B1
(45) Date of Patent: Jun. 2, 2009

(54) SYSTEMS AND METHODS FOR PROVIDING NON-DEDICATED WIRELESS BACKUP SERVICE FOR MONITORED SECURITY SYSTEMS VIA BLUETOOTH

(75) Inventors: Thomas Wayne Bonner, Smyrna, GA (US); Russell Baggett, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 379 days.

(21) Appl. No.: 10/913,963

(22) Filed: Aug. 7, 2004

Related U.S. Application Data (63) Continuation-in-part of application No. 10/684,876, filed on Oct. 13, 2003, now Pat. No. 7,085,551.

(60) Provisional application No. 60/461,953, filed on Apr. 8, 2003, provisional application No. 60/537,376, filed on Jan. 15, 2004.

(51) Int. Cl.
*H04B 7/00* (2006.01)

(52) U.S. Cl. ............... 455/41.2; 455/404.1; 455/404.2; 455/464; 455/445; 455/556.1; 379/39; 379/45; 340/539.1; 340/686.6

(58) Field of Classification Search ............ 455/41.2, 455/404.1, 404.2, 445, 464, 556.1; 379/39, 379/40, 37, 51, 45
See application file for complete search history.

(56) References Cited

U.S. PATENT DOCUMENTS

| | | | | |
|---|---|---|---|---|
| 4,887,290 A | * | 12/1989 | Dop et al. | 379/33 |
| 4,993,059 A | * | 2/1991 | Smith et al. | 379/39 |
| 5,131,019 A | * | 7/1992 | Sheffer et al. | 379/39 |
| 5,146,486 A | * | 9/1992 | Lebowitz | 379/40 |
| 5,185,779 A | | 2/1993 | Dop et al. | |
| 5,239,586 A | | 8/1993 | Marui | |
| 5,517,547 A | * | 5/1996 | Ladha et al. | 379/40 |
| 5,638,046 A | * | 6/1997 | Malinowski | 340/539.17 |
| 5,675,626 A | | 10/1997 | Davis | |
| 5,832,378 A | | 11/1998 | Zicker et al. | |
| 5,940,758 A | | 8/1999 | Chavez, Jr. et al. | |
| 6,032,037 A | | 2/2000 | Jeffers | |
| 6,222,458 B1 | * | 4/2001 | Harris | 340/686.6 |
| 6,263,050 B1 | * | 7/2001 | Akhteruzzaman et al. | 379/45 |
| 6,411,802 B1 | | 6/2002 | Cardina et al. | |
| 6,430,268 B1 | | 8/2002 | Petite | |
| 6,532,360 B1 | | 3/2003 | Shaffer | |
| 6,661,340 B1 | * | 12/2003 | Saylor et al. | 340/517 |
| 6,667,688 B1 | | 12/2003 | Menard et al. | |
| 6,747,556 B2 | * | 6/2004 | Medema et al. | 340/539.12 |
| 6,810,234 B1 | | 10/2004 | Rasanen et al. | |

(Continued)

*Primary Examiner*—Marceau Milord
(74) *Attorney, Agent, or Firm*—Parks Knowlton LLC; Paul Knowlton, Esq.; Jonathan A. Paulls (57) ABSTRACT

An interface provides a non-dedicated wireless communications path for reporting alarm events from a landline-based alarm system to a remote monitoring system via BLUETOOTH. The interface includes a BLUETOOTH receiver that communicates with a cellular handset, or other wireless device that has a BLUETOOTH transmitter, and a network connector (such as RJ31X jack) between an alarm control panel and the PSTN. When a wireless device is within range of the interface, the interface bypasses the landline and routes all security calls from the alarm control panel through an analog-to-digital signal processor and to the wireless device via BLUETOOTH, which places a call to the remote monitoring center.

7 Claims, 5 Drawing Sheets

U.S. PATENT DOCUMENTS

| | | | |
|---|---|---|---|
| 6,844,813 B2 * | 1/2005 | Hardman | 340/539.1 |
| 6,965,313 B1 * | 11/2005 | Saylor et al. | 340/539.18 |
| 2002/0167293 A1 | 11/2002 | Ptasinski et al. | |
| 2003/0045235 A1 * | 3/2003 | Mooney et al. | 455/41 |
| 2003/0108016 A1 * | 6/2003 | Bonta | 370/338 |
| 2003/0125010 A1 * | 7/2003 | Jung | 455/404 |
| 2003/0176199 A1 | 9/2003 | Burnham | |
| 2003/0203730 A1 * | 10/2003 | Wan et al. | 455/404.2 |
| 2003/0207689 A1 | 11/2003 | Roberts et al. | |
| 2004/0014426 A1 * | 1/2004 | Moore | 455/70 |

* cited by examiner

SYSTEMS AND METHODS FOR PROVIDING NON-DEDICATED WIRELESS BACKUP SERVICE FOR MONITORED SECURITY SYSTEMS VIA BLUETOOTH

RELATED APPLICATION

The application is a continuation-in-part application which claims the benefit of the filing date of U.S. Non-Provisional application Ser. No. 10/684,876, entitled Systems and Methods for "Providing Non-Dedicated Wireless Backup Service for Monitored Security Systems" filed Oct. 13, 2003 now U.S. Pat. No. 7,085,551, the entirety of which is incorporated herein; which in turn claims the benefit of the filing date of U.S. Provisional Application Ser. No. 60/461,953, entitled Systems and Methods for "Providing Non-Dedicated Wireless Backup Service for Monitored Security Systems" filed Apr. 8, 2003, the entirety of which is incorporated herein. This application also claims the benefit of the filing date of U.S. Provisional Application Ser. No. 60/537,376, entitled Systems and Methods for "Providing Non-Dedicated Wireless Backup Service for Monitored Security Systems via BLUETOOTH" filed Jan. 15, 2004, the entirety of which is incorporated herein.

FIELD OF THE INVENTION

The present invention relates in general to telecommunications and monitored security systems, and more particularly, to providing a non-dedicated wireless backup service for reporting alarm events and defective telephone lines in which a BLUETOOTH connection is established and which causes an intelligent interface to bypass a landline path to a remote monitoring center, and to relay all alarm event data from an alarm system control panel to the remote monitoring center through a wireless backup.

BACKGROUND OF THE INVENTION

The security industry has long used monitored alarm systems to report burglaries, fire, smoke, and similar alarm events. The typical monitored alarm system includes a control panel that receives data from sensors, intelligence that analyzes the data, and signaling components that report detected alarm events to a remote monitoring center. Alarm events are typically reported via a dial-up circuit switched data (CSD) connection to a public switched telephone network (PSTN) or other wireline network. The remote monitoring center resolves the event by notifying and/or dispatching appropriate responders, such as emergency medical services (EMS), local security personnel, firefighters, and police departments. Most alarm system control panels also include indicators that warn the occupants of the residence or facility of the emergency condition.

Standard phone lines may be unreliable, particularly because events such as intentional tampering, fires, and major calamities can compromise the physical communications infrastructure. To address the reliability issues, the alarm industry has developed methods of using wireless communications technology to supplement PSTN-based alarm systems, or as the sole means of communicating alarm events to remote monitoring centers.

Several approaches for wirelessly reporting alarm events have evolved in the industry. Perhaps the most basic wireless alarm event reporting system consists of a data interface to a dedicated cellular transceiver. Alarm signals and other messages can be routed over a voice channel via the dedicated cellular transceiver. As an example, the GSM 1000™ system transmits alarm signals over a GSM voice network. Conventional systems have never previously implemented the use of a cellular mobile handset that is not specifically dedicated to a security alarm system and which is capable of dynamic two-way communication with the security alarm system. At most, optional key-fobs have been available that were limited to wirelessly arming and disarming the security alarm system. The key-fobs however do not support the transmission and receipt of alarm notification messaging, such as text messages to indicate that the security alarm system is armed, disarmed or breached.

Alternatively, digital signals may be transmitted over overhead control channels via a dedicated wireless device. For instance, the SKYROUTE™ transceiver uses the CELLEMETRY® wireless technology and the SS7/IS-41 network protocol to transmit short data messages without affecting the voice channels of the cellular network.

Another approach provides wireless alarm event reporting via a dedicated data-only packet-switched network, such as the narrowband MOBITEX™ mobile data technology developed by ERICSSON®. In contrast to the aforementioned systems, which use circuit-switched voice networks, a packet-switched approach obviates the need for dedicated connections for each reporting session, and potentially reduces the cost of each transmission, which is based on the number of packets sent rather than call connection time. However, this approach also introduces the additional cost of a dedicated radio modem that utilizes the Mobitex Interface Specification (MIS) open standard, which is administered by the Mobitex Operators Association.

In many of these approaches, the alarm system wirelessly communicates using the backup device only if the alarm system cannot access a landline telephone service. The backup device communicates with a mobile switching center (MSC), which authenticates the backup device and routes the call to a monitoring center.

In other approaches, the wireless communication technology is the primary or sole means of communicating with the remote monitoring center.

Typical wireless alarm event reporting approaches have several disadvantages. According to many such approaches, when an alarm event occurs, the alarm system control panel first attempts to transmit data over a PSTN connection. After detecting a transmission failure on the landline, the control panel determines that the landline is unavailable or disrupted, and transmits the data using the wireless backup device. Therefore, the alarm system only detects a loss of line integrity when the alarm system attempts to report another detected event. An alarm system that uses such a backup system may introduce a delay before reporting the disabled landline and any other alarm event. Some alarm systems attempt to address this shortcoming by periodically attempting a PSTN call to test the landline. However, this solution is imperfect due to the unnecessary disruption of the user's ability to access the landline during these tests. The test calls can also cause computer modems to lose carriers. Other alarm systems periodically check the telephone line for dial tone, but cannot detect loss of dial tone that occurs between scheduled checks.

The aforementioned systems determine the availability of a wireline connection before resorting to a backup system. To contrast, in the context of call forwarding, systems and methods have been developed for detecting the availability of a wireless device, and then performing a function in response thereto. However, these systems and methods are typically adapted to reroute to a wireline device incoming calls directed to the wireless device, rather than to route outgoing calls to the wireless device for completion.

Typical wireless event reporting devices can be expensive, due at least in part to the cost of the dedicated wireless device, service fees for access to cellular voice or data channels, and the cost of installation. Wireless alarm event reporting devices are commonly installed by making electrical connections between a telephone line and the monitoring device (such as an alarm system control panel), and between the monitoring device and a power source. Separate connections must also be made to connect the monitoring device to a radio or a cellular device, which relays the reporting data to a central station. The customer either directly or indirectly bears the cost of installation, which may require the expertise of an electrician or other professional. Furthermore, the alarm system control panel may have to be specially manufactured or modified to accommodate communication over a wireless network.

Thus, there is a need for a reliable, responsive, and less expensive system and method for providing a wireless backup to landline-based alarm systems for reporting alarm events to remote monitoring centers.

SUMMARY OF THE INVENTION

The present invention fulfills the needs described above by providing systems and methods for supplying non-dedicated wireless backup service for monitored security systems. Generally, the invention provides an intelligent interface between an existing alarm system control panel (ASCP) and a remote monitoring center. The intelligent interface relays alarm event data signals from the alarm system control panel to the remote monitoring center via a landline connection—unless a wireless device, such as a typical cellular handset, has been placed in a cradle that is integral to or associated with the interface.

The invention also includes a method for providing wireless backup to an alarm system control panel, wherein placing a wireless device in the cradle automatically causes the intelligent interface to bypass the landline connection, and to relay all alarm event data from the ASCP to the wireless device. In certain embodiments, the method includes determining whether the cellular handset is available to the interface before the bypass can be effected. For example, the interface may determine whether the cellular handset is sufficiently powered or has the requisite signal strength to place a wireless call. The systems and methods of the various embodiments of the invention are advantageous in many respects. No dedicated wireless device is required, because the intelligent interface provides wireless backup service to a landline-based alarm event reporting system, using a standard cellular handset or similar wireless device. When no wireless device is present, the intelligent interface acts as a standard PSTN network connector, such as an RJ31X jack. The RJ31X jack allows the ASCP to seize the plain old telephone service (POTS) line before the inside house phone so that an inside house phone cannot interrupt the reporting of alarms to a remote monitoring center. The RJ31X jack may allow the control ASCP to be disconnected from the POTS service without interrupting POTS service to the internal house phone.

Therefore, the intelligent interface is compatible with existing control panels and remote monitoring centers without modification thereof.

The intelligent interface also performs the functions of a typical tabletop cradle for the wireless device, including powering and recharging the battery of the wireless device. The intelligent interface can be powered by a DC power supply, or by the control panel. The intelligent interface receives signals from the alarm system control panel via an input that is typically connected to v.32 analog modem tip and ring connectors at the alarm system control panel. The input can be, for example, a standard telephone connector (such as an RJ-11 jack), or a hard-wired tip and ring interface.

Another aspect of the present invention includes providing a non-dedicated wireless backup system for reporting alarm events from an alarm control panel that monitors alarm events to a remote monitoring center. The non-dedicated wireless backup system includes an interface, that receives signals from the alarm control panel and selectively relays the signals to the remote monitoring center by either: i) a wireless path via an RF link, or ii) a landline path via a landline connector.

More specifically, one aspect of the present invention includes a device for relaying signals from an alarm system control panel to a remote monitoring center. The device includes, but is not limited to, an input for receiving the signals from the alarm system control panel and an intelligent interface communicatively associated with the input. As used herein, the phrase "communicatively associated" means that at least a one-way transmission path is created for exchanging voice and/or data between two or more devices, components, elements, entities, systems or networks. The intelligent interface communicatively associates with the input in a variety of different forms, including by a physical and or wireless connection. The intelligent interface selectively relays the signals to the remote monitoring center via either a wireless device or a landline connector. The intelligent interface bases its selection between the two communications paths on the presence or absence of a wireless device in a cradle that is integrated into the intelligent interface. The cradle receives the wireless device in such a manner that the intelligent interface can detect that the wireless device is present in the cradle. The presence of the wireless device preferably mechanically alters the communications path established by the internal wiring of the intelligent interface. Preferably, detecting that the wireless device is present in the cradle causes the intelligent interface to bypass the RJ31X or other landline connector and to communicatively associate the input from the alarm system control panel with the wireless device. The bypass is preferably effected by mechanically routing the Tip and Ring connections from the alarm system control panel to the respective Tip and Ring connections on the wireless device, although electronic routing may be implemented. For example, placing the wireless device in the cradle can cause shorting bars to create a direct connection between the alarm system control panel and the wireless device.

Once the wireless device is communicatively associated with the input (and thus with the alarm system control panel), any alarm event reporting signals generated by the alarm system control panel are diverted away from the landline connection and into the wireless device. Preferably, an analog-to-digital digital signal processor (DSP) "converter" is interposed between the input and the wireless device. The converter provides dial tone and ringing signals to the alarm system control panel, and can accept dual-tone multi-frequency (DTMF) signals from the alarm system control panel. The converter receives signals from the alarm system control panel via the input, converts the signals into digital signals, and outputs or relays the converted signals to the wireless device.

Upon receiving the signals, the wireless device places a wireless call to the remote monitoring center and relays the signals from the alarm system control panel (via the input) to the remote monitoring center. The wireless call can be carried by any suitable wireless network, including voice-only, voice and data, and data-only wireless networks.

The intelligent interface also includes a landline connector, which is preferably a two-wire voice jack, such as an RJ31X jack. The landline connector is communicatively associated with the alarm system control panel (via the input) and with a public switched telephone network. When no wireless device is present in the cradle, the landline connector receives the signals from the input, and relays the signals to the remote monitoring center via the PSTN.

Preferably, detecting that the wireless device is present in the cradle also causes the intelligent interface to place the Tip and Ring connections of the internal telephones in direct connection with the respective inputs to the PSTN network.

The intelligent interface preferably also includes status indicators to indicate whether alarm event calls are routed to a wireless device, and/or the availability of the wireless device.

According to another aspect of the invention, systems and methods for providing wireless backup to an alarm system control panel are provided in which a BLUETOOTH connection is established which automatically causes the intelligent interface to bypass the landline connection, and to relay all alarm event data from the ASCP to the wireless device. Likewise, the wireless device may be utilized to report alarm conditions to a central monitoring center via BLUETOOTH technology. Moreover, the wireless device may be used as a remote control key fob, and as a display device for reporting alarms.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION

Figure 1:
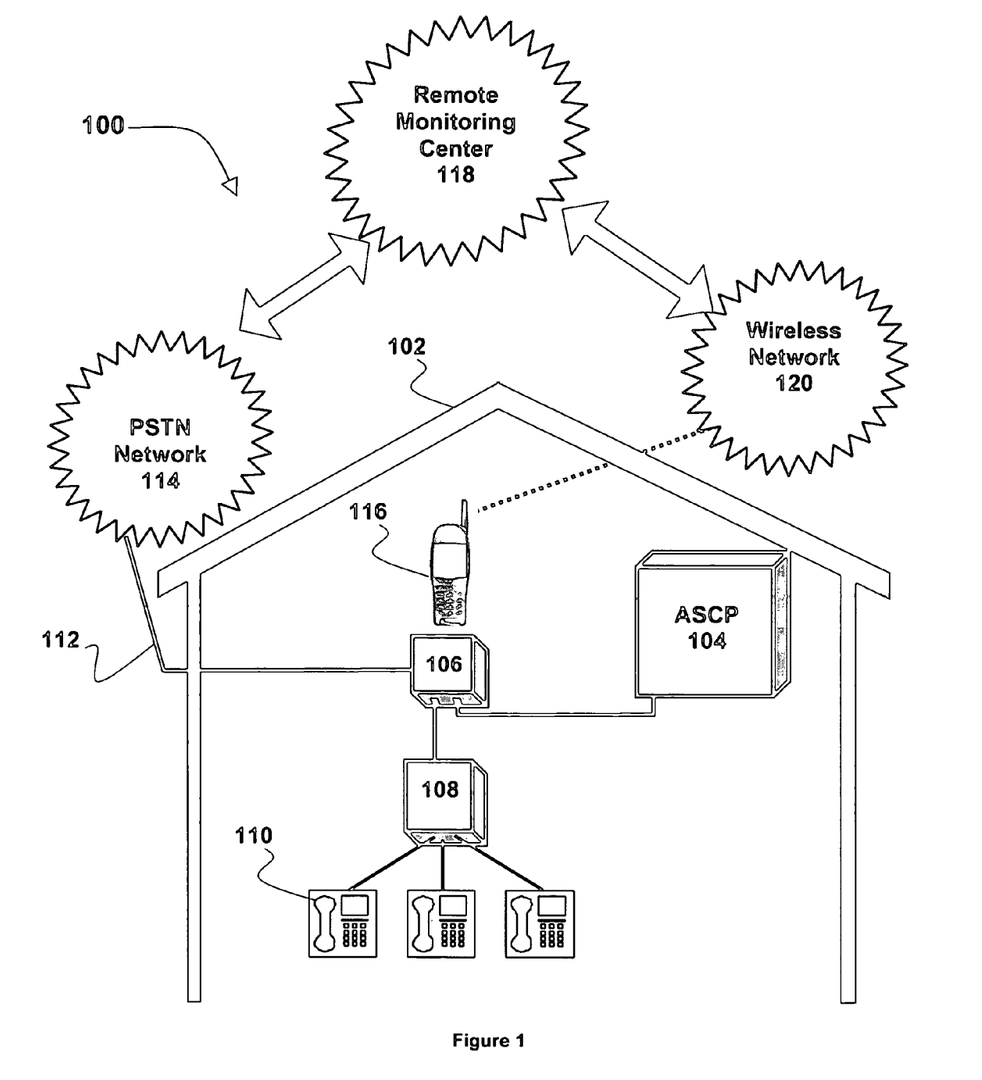
FIG. 1 is a block diagram of an exemplary environment.

Particular embodiments of the present invention will now be described in greater detail with reference to the drawings. FIG. 1 is a block diagram showing an exemplary environment according to various embodiments of the invention. The environment 100 shown is a residential structure 102 equipped with a monitored security system having an alarm system control panel (ASCP) 104. The ASCP 104 can be any suitable device that detects alarm events and transmits data over a landline to a remote monitoring center. The ASCP 104 relays signals related to detected alarm event to an intelligent interface 106 that includes a means for selectively relaying the signals to the remote monitoring center via either a wireless device or a landline connector, based on the presence of the wireless device. According to an exemplary embodiment of the present invention, the intelligent interface 106 is connected in series with the ASCP 104 and a subscriber junction box (SJB) 108. The SJB 108 is generally the physical interface between internal subscriber devices 110 and a subscriber line 112 that transmits and receives voice and data to and from a PSTN network 114.

The intelligent interface 106 is illustrated as a cradle (shown in FIG. 6) for receiving a wireless device, such as a cellular handset 116. The intelligent interface 106 acts as a standard network connector when the cellular handset 116 is not present in the cradle. More specifically, the intelligent interface 106 enables the ASCP 104 to seize the subscriber line 112 to place a call over the PSTN network 114 (via at least one PSTN network interface device) to relay alarm event signals to a remote monitoring center (RMC) 118. However, when the cellular handset 116 has been received communicatively in the cradle, the intelligent interface 106 causes the call, to the remote monitoring center 118, to be placed by the wireless device 116 over a wireless network 120.

Dual Mode Operation

The selective relaying of alarm event calls by the intelligent interface 106 will now be described in more detail. For clarity, the intelligent interface 106 will be described as a "dual-mode" device, having a landline mode and a wireless mode. The intelligent interface 106 transitions between the two modes based upon the presence or absence of the cellular handset 116 in the cradle (or as will be described later, the intelligent interface 106 in close proximity to the cellular handset 116). As used herein, the terms "presence" and "present" refer to a communicative association of the cellular handset 116 with the intelligent interface 106, such that the cellular handset 116 is available for wireless communications emanating from the intelligent interface. In the alternative, the communicative association of the cellular handset 116 with the intelligent interface 106 may be created by a physical connection with the cradle and/or by a wireless RF communicative association between the cellular handset 116 and the intelligent interface 106. The terms "absence" and "absent" refer to the lack of communicative association between the cellular handset 116 and the intelligent interface 106. Absence may indicate that the cellular handset 116 is not physically in association with the cradle, or that the cellular handset 116 is bypassed, powered down, unable to access the wireless network, or is otherwise unavailable to the intelligent interface 106.

The phrase "landline mode" refers generally to the condition and operating characteristics of the intelligent interface 106 when there is no cellular handset 116 in the cradle component of the intelligent interface 106, or the cellular handset 116 is otherwise unavailable (e.g., because it is not in close proximity or a predetermined distance from the intelligent interface 106). The phrase "wireless mode" refers generally to the condition and operating characteristics of the intelligent interface 106 when a cellular handset 116 is present (or in close proximity to the intelligent interface 106) in the cradle. However, the intelligent interface 106 can be manually placed in landline mode via a bypass mechanism, which can be activated despite the presence of the cellular handset 116 in the cradle. Alternatively, the bypass mechanism may be activated automatically upon the occurrence of an event (such as placement of a powered down or otherwise disabled cellular handset 116 in the cradle), or according to a program or schedule.

Figure 2:
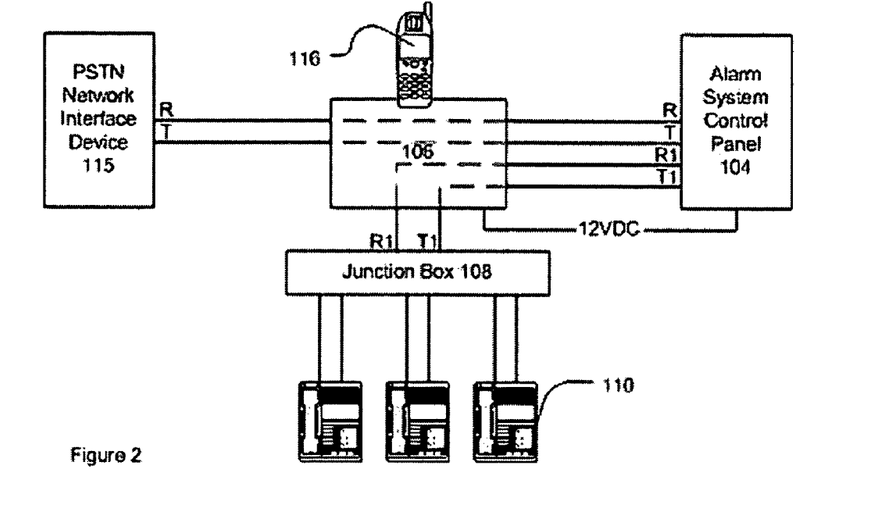
FIG. 2 is a block diagram showing functional interconnections of the intelligent interface in landline mode, according to various embodiments of the invention.

FIG. 2 is a generalized block diagram showing functional interconnections of the intelligent interface 106 in landline mode, according to various embodiments of the invention. The intelligent interface 106 is connected in series between the ASCP 104 and the PSTN network interface device (PNID) 115, which may be an end office or other exchange. The intelligent interface 106 is also connected in series between the ASCP 104 and the SJB 108.

In the landline mode, a conductive path from the PSTN network 114 that is commonly referred to as the "tip wire" (T) is routed through the intelligent interface 106 directly to a signaling tip terminal at the ASCP 104. A "ring wire" (R) is routed through the intelligent interface 106 directly to a signaling ring terminal at the ASCP 104. Alarm event signals can be transmitted from the ACSP 104 to the RMC 118 over the PSTN network 114 via these interconnections, in accordance with known standard landline technology.

In the landline mode, the intelligent interface 106 enables the ASCP 104 to "seize" the landline by disrupting any ongoing calls and preventing initiation of new calls by the internal subscriber devices 110. To do so, the intelligent interface 106 functions as a standard PSTN network connector, such as an RJ31X jack. The tip and ring wires (T1 and R1) from the SJB 108 are routed through the intelligent interface 106 directly to corresponding secondary tip and ring terminals at the ASCP 104. When the ASCP 104 detects an alarm event, these series tip and ring connections enable the ASCP 104 to provide seizure or exclusion service—delivering dial tone to the ACSP 104 while excluding (by electrically disconnecting) the subscriber devices 110.

Figure 3:
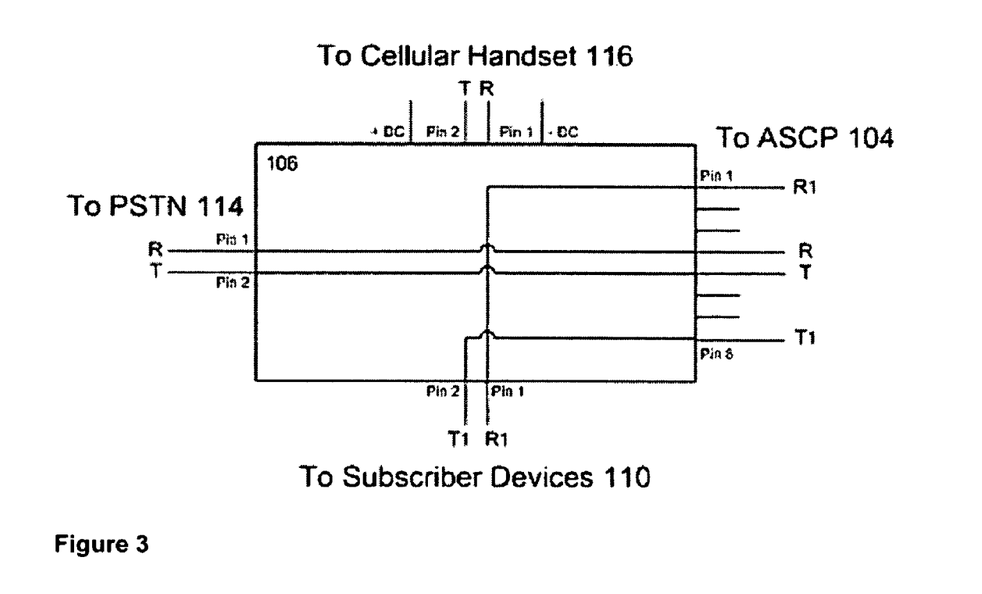
FIG. 3 is a block diagram showing functional interconnections of the intelligent interface in wireless mode, according to various embodiments of the invention.

FIG. 3 is a circuit diagram showing the electrical interconnections when the intelligent interface 106 is in landline mode, according to various embodiments of the invention. The ASCP 104 is coupled with the intelligent interface 106 using a suitable known or later developed connection device, such as an RJ-45 miniature 8-position keyed connector or a direct hard-wired connection. This connection device functions as a means for receiving the signals from the ASCP 104. The SJB 108 and the PNID 115 are coupled with the intelligent interface 106 using suitable known or later developed connection devices, such as a standard RJ-11 or RJ-14 miniature 6-position connectors or direct hard-wired connections. In the figure, ASCP Pin 1 (the secondary ring terminal) is connected in series with SJB Pin 1 (the SJB ring wire). ASCP Pin 8 (the secondary tip terminal) is connected in series with SJB Pin 2 (the SJB tip wire). PNID Pin 1 (the ring wire) is connected in series with ASCP Pin 4. PNID Pin 2 is connected in series with ASCP Pin 5.

Figure 4:
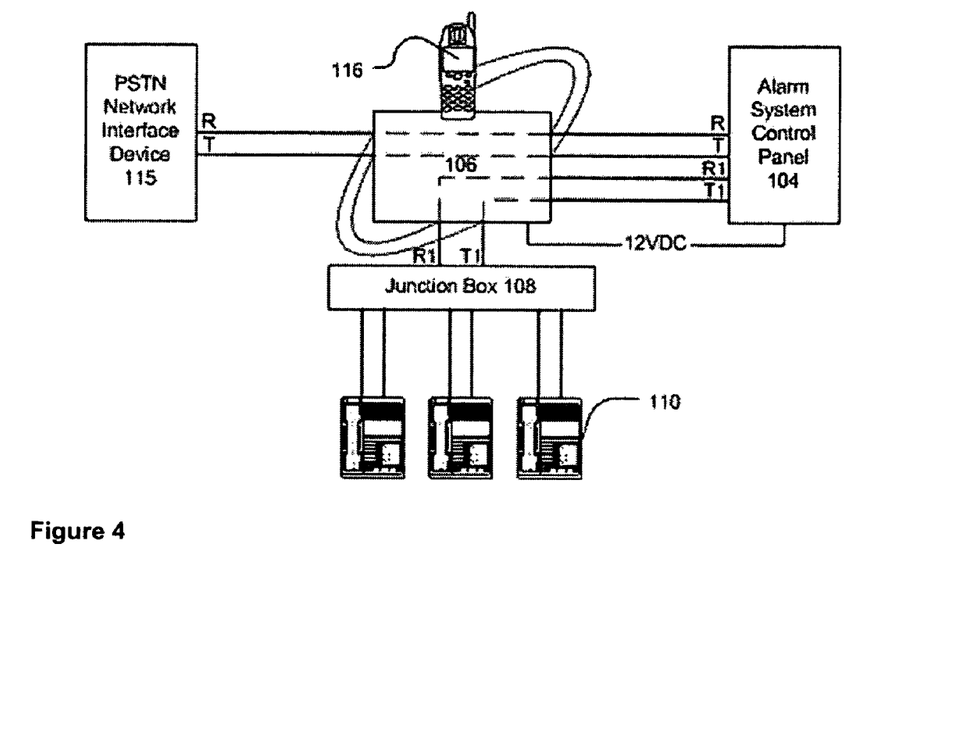
FIG. 4 is a circuit diagram showing the functional interconnections when the handset is not present in the cradle, according to various embodiments of the invention.

FIG. 4 is a generalized block diagram showing functional interconnections of the intelligent interface 106 in wireless mode, according to various embodiments of the invention. The intelligent interface 106 is connected in series between the SJB 108 and the PSTN network interface device (PNID) 115. The intelligent interface 106 is also connected in series between the ASCP 104 and the cellular handset 116.

In the wireless mode, the series connections of tip and ring wires from the PNID 115 through the intelligent interface 106 directly to the SJB 108 allow subscriber devices 110 continuous and uninterrupted access to the landline, regardless of the activation state of the ASCP 104. The series connections of the tip and ring signaling tip terminals from the ASCP 104 directly to the cellular handset 116 cause the ACSP 104 to place alarm event reporting calls using the cellular handset 116.

Thus, in the wireless mode, the ASCP 104 has no need to "seize" the landline to report alarm events. Rather, when the ASCP 104 detects an alarm event, the cellular handset 116 is directed to place a call to the remote monitoring center 118. Alarm event signals to and from the ASCP 104 are converted using a DSP (shown in FIG. 7) and transmitted via the wireless network 120.

In the wireless mode, the intelligent interface 106 may cause the cellular handset 116 to refuse any incoming calls and disable any manual override of an ongoing alarm event reporting session. To do so, the intelligent interface 106 may issue control signals (e.g., disabling the keypad and/or canceling call waiting) prior to permitting the ASCP 104 to initiate an alarm event reporting call.

Figure 5:
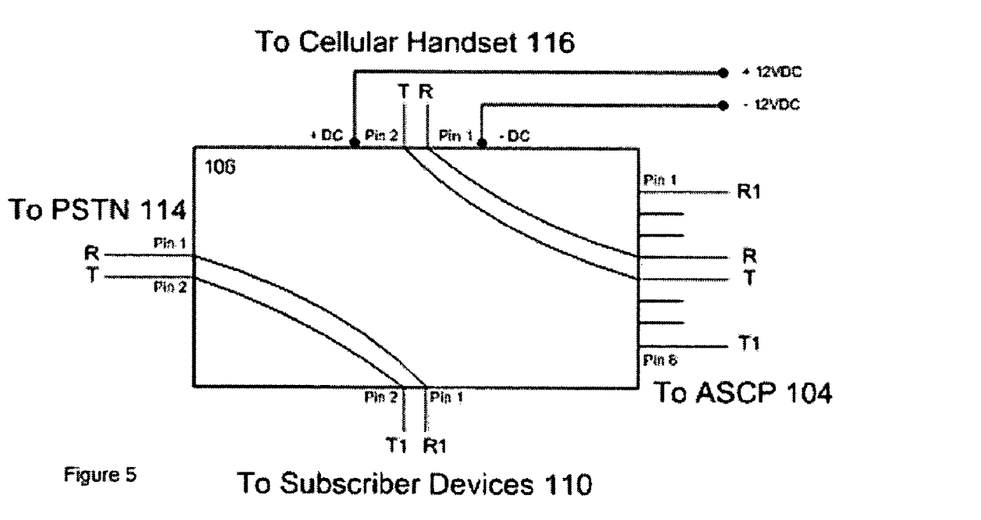
FIG. 5 is a circuit diagram showing the functional interconnections when the handset is present in the cradle, according to various embodiments of the invention.

FIG. 5 is a circuit diagram showing the electrical interconnections when the handset is present in the cradle (wireless mode). The ASCP 104, SJB 108, PNID 115 are coupled with the intelligent interface 106 using suitable known or later developed connection devices and/or methods, as described above with respect to FIG. 3. The cellular handset 116 is coupled with the intelligent interface 106 via a handset cradle that is compatible with the make and model of the cellular handset 116. Cellular handset cradles typically have at least a positive DC (+DC) and a negative DC (−DC) power supply terminal, and two pins—one designated as a tip terminal and one designated as a ring terminal. When the cellular handset 116 is present in the cradle, the intelligent interface 106 transitions from landline to wireless mode. In wireless mode, the cellular handset tip terminal is connected in series with the ASCP tip terminal (Pin 5, as shown). The cellular handset ring terminal is connected in series with the ASCP ring terminal (Pin 4, as shown). Thus, all alarm event signals are passed to the cellular handset 116. The transition to wireless mode also causes the SJB tip and ring wires to be connected in series with the respective PNID tip and ring wires.

The invention is not limited to the connectors or pin assignments shown, which are primarily designated by way of example.

Figure 6:
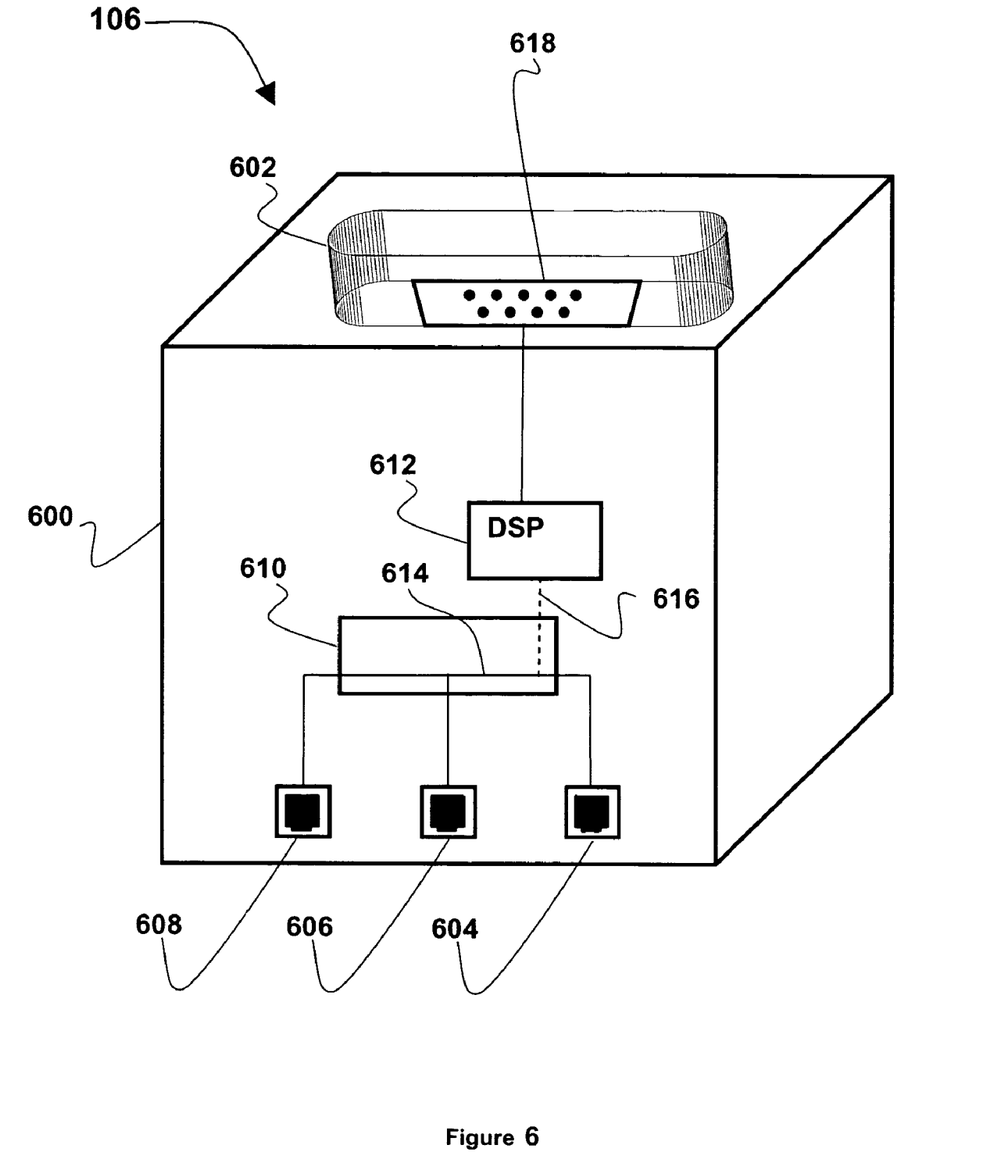
FIG. 6 is a block diagram of an exemplary intelligent interface device according to various embodiments of the invention.

FIG. 6 is a block diagram of an exemplary intelligent interface 106 according to various embodiments of the invention. The intelligent interface 106 preferably includes an enclosure 600 that defines a cradle 602 for receiving a cellular handset 116 or other wireless device. The enclosure 600 also defines an input 604, an SJB jack 606, and a PSTN jack 608 for communicatively associating the ASCP 104, SJB 108, and PSTN 114 with the intelligent interface 106, respectively. The input 604, SJB jack 606, and PSTN jack 608 are preferably easily accessible from the exterior of the intelligent interface 106.

According to certain embodiments of the invention, a network connector 610 is interconnected with the input 604, SJB jack 606, and PSTN jack 608. The network connector 610 functions as a PSTN network connector (such as an RJ-31X connector) when the intelligent interface 106 is in landline mode—seizing the landline 112 and connecting the ASCP 104 in series with the PSTN 114 when the ASCP 104 places an alarm event reporting call. The network connector 610 functions as a wireless bypass connector when intelligent interface 106 is in wireless mode—bypassing the landline 112 and placing the ASCP 104 in communication with the cellular handset 116.

As mentioned above, a converter, for example DSP 612, is preferably interposed between the ASCP 104 and the cellular handset 116, such that in wireless mode, signals from the ASCP 104 are converted from analog to digital. This conversion allows the intelligent interface 106 to convert DTMF tones generated by the ASCP 104 into signals that can be interpreted by the cellular handset 116 as commands and dialing information, and into data that can be transmitted over a wireless network. The functionality of the DSP 612 may alternatively be implemented in cellular handset 116.

The intelligent interface 106 transitions between landline mode and wireless mode primarily based on the absence or presence of the cellular handset 116 in the cradle 602. The transition is preferably effected mechanically, by means of a mechanical switching mechanism inside the cradle 602 that is triggered by the insertion or removal of the cellular handset 116. In one embodiment, to transition to wireless mode, the switching mechanism breaks or otherwise bypasses the connection 614 between the ASCP 104 and the network connector 610 and creates an alternate connection 616 between the ASCP 104 and the DSP 612, which is connected in series with the communications port of the cellular handset 116.

The intelligent interface 106 may also be placed in landline mode upon the activation of a bypass mechanism, such as a manual bypass button on the cradle 602, despite the presence of the cellular handset 116 in the cradle 602.

The communications port 618 for interfacing with the cellular handset 116 can be any known or later developed device or system usable for communicatively associating a wireless device to the intelligent interface 106, including an RS-232 serial port, infrared port, and a BLUETOOTH connection. It follows, therefore, that any such communications ports can function as means for receiving the wireless device in lieu of or in conjunction with the cradle described herein.

In certain other embodiments, the transition to and from wireless mode is effected electronically, by means of an electronic switching mechanism. A set of contacts (not shown) in the cradle 602 detect the presence of the cellular handset 116, and send a corresponding signal to a controller (not shown) that is integral to the intelligent interface 106. The controller opens the circuit between the ASCP 104 and the network connector 610 and closes an alternate path between the ASCP 104 and the DSP 612.

Figure 7:
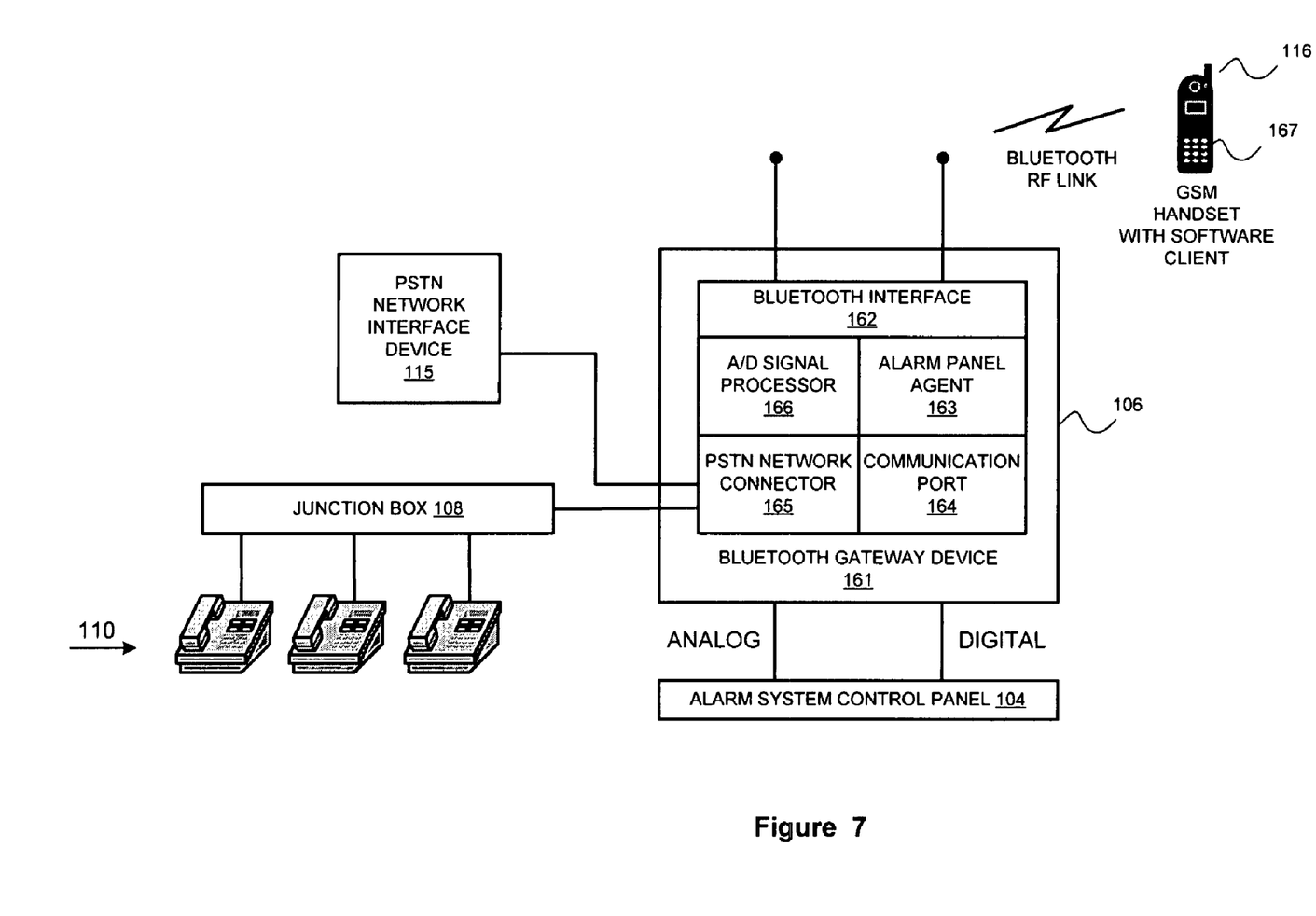
FIG. 7 illustrates an exemplary diagram of an intelligent interface composed of a BLUETOOTH gateway device for providing non-dedicated wireless backup service for reporting alarm events and defective telephone lines.

In addition, the transition to and from wireless mode may be effected by an RF communicative association. For example, BLUETOOTH, or some other RF technology, may be employed as the communication association, or medium, implemented between the intelligent interface 106 and the cellular handset 116 that allows remote control and alarm reporting to and from the ASCP 104 to occur. For purposes of this exemplary embodiment, BLUETOOTH may be chosen as the preferred RF technology. In this case, no physical connection is required between the intelligent interface 106 and the cellular handset 116. A one-time BLUETOOTH "pairing" process is performed prior to communication between the BLUETOOTH gateway device 161 and the cellular handset 116 so that the devices can be authorized to communicate with each other via a "paired link" during a BLUETOOTH communication session.

FIG. 7 illustrates an intelligent interface 106 composed of a BLUETOOTH gateway device 161. The BLUETOOTH gateway device 161 includes a BLUETOOTH interface 162, an alarm panel agent 163, a communication port 164, a PSTN network connector 165, and an analog-to-digital (A/D) signal processor 166. The BLUETOOTH gateway device 161 is configured to communicate with the PNID 115, the SJB 108, the ASCP 104, and the cellular handset 116. The BLUETOOTH gateway device 161 facilitates communication between the ASCP 104 and the cellular handset 116 via a BLUETOOTH RF link.

In accordance with systems and methods of this invention, numerous advantages may be realized by implementing a BLUETOOTH RF link between the BLUETOOTH gateway device 161 and the cellular handset 116. The overall stability of the alarm system is improved since no physical connection is required between the cellular handset 116 and the BLUETOOTH gateway device 161. Once the cellular handset 116 is brought within a predetermined distance of the BLUETOOTH gateway device 161, a virtual connection is made via a BLUETOOTH RF link between the intelligent interface 106 and the cellular handset 116. In accordance with this exemplary configuration, it is easier to transmit commands and/or information to and from the cellular handset 116 and the ASCP 104. Likewise, it is also easier to transmit information, such as status reports, alarm reports, and notifications, from the ASCP 104 to the remote monitoring center 118 via the wireless network 120 and/or the PSTN network 114.

The BLUETOOTH gateway device 161 includes intelligent software for handling BLUETOOTH communications and signaling for various applications, such as: link access control; service discovery; and data communications. BLUETOOTH communications and data transfer are familiar to those skilled in the art, particularly in view of standards and profile specifications promulgated by the BLUETOOTH SIG and other industry entities. The BLUETOOTH communication between the cellular handset 116 and the BLUETOOTH gateway device 161 can be composed of any now known, or later developed, power rating class associated with various BLUETOOTH transmission ranges.

The PSTN network connector 165 is an intelligent interface that may be implemented as an RJ31X jack. The RJ31X jack may be implemented as a standard voice jack, a series jack behind a network interface, a two-wire, a T/R connection, a single line series T/R connection ahead of all station equipment, a single line for alarm reporting devices, or the like.

The communication port 164 is the physical interface provided between a serial port on the ASCP 104 and the alarm panel agent 163 of the BLUETOOTH gateway device 161. The communication port 164 may be implemented as an RS-232 adapter, and/or any other communication port now known or later developed.

The A/D signal processor 166 is a digital signal processor (DSP) converter that: converts analog signals to digital signals; provides telephony analog signaling; and interacts with the PSTN network connector 165 interface.

The alarm panel agent 163 may be implemented as software that interacts with the ASCP 104 and the cellular handset 116 to send and receive alarms notifications, commands, reports, and control BLUETOOTH communications.

The BLUETOOTH interface 162 may be software based and implemented to operate with BLUETOOTH to control a BLUETOOTH radio chipset that interacts with the alarm panel agent 163 and the A/D signal processor 166.

According to this exemplary embodiment, the cellular handset 116 may be a BLUETOOTH enabled handset, such as for example a GSM handset. The cellular handset 116 may include a user interface 167 that contains various components and/or processes that function in accordance with systems and methods of invention. For example, the cellular handset 116 may provide BLUETOOTH communications and signaling via intelligent software that handles BLUETOOTH signaling for link access control, service discovery, and data communications. An alarm panel agent may be implemented into the cellular handset 116 that handles the alarm panel protocol for communications and commands, and for interacting with the alarm panel agent 163 that communicates with the alarm control panel 104. The user interface 167 may include software on the cellular handset 116 that is to be used by the subscriber to configure various features, such as the BLUETOOTH RF link, the security services, and/or to communicate with the alarm control panel 104, or the like.

In operation, the BLUETOOTH gateway device 161 allows the ASCP 104 to communicate with the cellular handset 116 using a BLUETOOTH RF link. A one-time BLUETOOTH pairing process may be completed prior to performing any one of the operations described below. Various aspects and/or features of this invention include using the cellular handset 116 (within an enclosed space, for example, within a subscriber's residential structure 102) to: (1) send commands to the ASCP 104; (2) receive status and alarm reports from the ASCP 104; and (3) send alarm notification from the ASCP 104 to the central monitoring center 118 over the BLUETOOTH and GSM radio links.

In particular, the cellular handset 116 may be used to send operational commands to the ASCP 104. That is, a subscriber may elect to send commands with her cellular handset 116 to an ASCP 104 inside of the subscriber's house. For example, a subscriber may gain access to a particular ASCP 104 by keying-in phone number (and perhaps and access code) via her cellular handset 116 to the location where the ASCP 104 is located. The cellular handset 116 may then communicate the phone number to the ASCP 104 via the BLUETOOTH gateway device 161. The compatibility of the cellular handset 116 and the BLUETOOTH gateway device 161 may then be verified to ensure that they were appropriately configured to communicate with each other. Commands can be sent over a variety of transport services, such as SMS, MMS, WAP, and/or any other medium, or format, capable of sending commands that is now know or later developed.

The BLUETOOTH gateway device 161 and the cellular handset 116 are configured to operate via BLUETOOTH wireless technology within a personal-area-network, or piconet. The piconet is composed of a master and from at least one to numerous active slave devices. Once the piconet is established, the participating devices randomly hop frequencies in unison so that they stay in touch with one another and avoid other piconets that may be operating in the same room, such as a piconet formed between a television and its remote control. The device designated as the master makes the determination of the channel (frequency-hopping sequence) and phase (timing offset, i.e., when to transmit) that shall be used by all devices on the piconet. In accordance with systems and methods of this invention, the master and slave relationship may be implemented, and/or exchanged, between the cellular handset 116 and the BLUETOOTH gateway device 161.

For purposes of this example, the BLUETOOTH gateway device 161 operates as the master and the cellular handset 116 is implemented as the slave. In accordance with standard BLUETOOTH link control manager protocol, the BLUETOOTH gateway device 161 broadcasts a beacon signal in order to detect the presence of the cellular handset 116. In a sniff mode, the cellular handset 116 detects the broadcast beacon signal and verifies whether the beacon broadcasted signal is valid. That is, the cellular handset 116 determines whether an address associated with the broadcast beacon signal transmitted from the BLUETOOTH gateway device 161 matches, or is paired with, an address associated with the cellular handset 116. The broadcast and sniffing operation between the BLUETOOTH gateway device 161 and the cellular handset 116 may be continuously intermittently performed.

A "paired link" connection is automatically initiated between the cellular handset 116 and the BLUETOOTH gateway device 161 when the presence of the cellular handset 116 is detected by the BLUETOOTH gateway device 161. When the address from each of the devices is authenticated (i.e., a paired link connection is formed) attached between the two devices occurs. That is, a personal-area-network, or piconet is created. Thereafter, the BLUETOOTH gateway device 161 may evaluate and recognize the cellular handset 116 as a valid client and may communicate via BLUETOOTH wireless technology with the cellular handset 116.

Once the cellular handset 116 is attached to the BLUETOOTH gateway device 161, the subscriber may be prompted to select from a variety of home security menu options, such as: arm; disarm; panic; and/or any other security alarm menu option now known or later developed. Access to perform the various commands, such as arming and disarming the alarm security system, may be performed by a variety of other methods that are commonly known or later developed, such as by entering and transmitting a security code on the ASCP 104.

After the alarm security system has successfully performed the requested command, the ASCP 104 may then return a status indication to the subscriber's cellular handset 116 indicating that the alarm security system has executed the requested command.

Receiving Status and Alarm Reports From the ASCP

According to the second aspect of this invention, the cellular handset 116 may receive information from the ASCP 104, such as status and alarm reports. For example, after the alarm security system has successfully performed the requested command as described above, the ASCP 104 may then return an indication to the cellular handset 116 informing the subscriber that the alarm security system has executed the requested command.

By way of further illustration, the following assumptions may be made. The alarm security system is armed and the BLUETOOTH gateway device 161 has detected the presence of, and recognized a cellular handset 116 (such as a GSM handset BLUETOOTH handset) as a valid client. Thus, both the BLUETOOTH gateway device 161 and the cellular handset 116 are ready to communicate with each other. As described above, the alarm security system has been activated and has been previously configured to send alarm events to the communication port 164 of the BLUETOOTH gateway device 161.

In operation, an alarm event may be generated, such as for example, when a particular zone being monitored by the alarm security system is and then sends alarm event text (or an alarm message) to its communication port. The communication port 164 of the BLUETOOTH gateway device 161 receives the alarm event text from the communication port of the ASCP 104. The alarm event text is read by the alarm panel agent 163 that then sends an alarm message to the cellular handset 116 using standard BLUETOOTH transmission procedures, as discussed above. The cellular handset 116 receives the transmission and displays the alarm message on a display of the cellular handset 116. The alarm message displayed on the cellular handset 116 can include any information about alarm event, such as the status of the alarm, and/or continuous reports generated by the ASCP 104.

In response, the subscriber may then be allowed to respond to the message displayed on her cellular handset 116. Communication between the cellular handset 116 and the ASCP 104 may be performed in real time or intermittently.

Sending Alarm Notifications from the ASCP to the Remote Monitoring Center (RMC) Over Bluetooth and/or Radio Links In accordance with a third aspect of this invention, the cellular handset 116 may be configured to send an alarm notification from the ASCP 104 to the RMC 118 over BLUETOOTH and/or GSM radio links. In accordance with this exemplary embodiment, it may be assumed that the home security system alarm is in an alarm state, and the subscriber may have already received the alarm notification identifying the current status of the alarm, as mention above.

In operation, the ASCP 104 initiates an off hook condition with its analog port. The PSTN network connector 165 mechanically cross connects the analog port of the ASCP 104 to the A/D signal processor 166. The A/D signal processor 166 simulates a dial tone, and collects dual tone multi-frequency (DTMF) digits from an analog modem that is in communication with the ASCP 104, and signals the alarm panel agent 163 to setup a BLUETOOTH voice path with the cellular handset 116. The cellular handset 116 completes the voice path with the BLUETOOTH gateway device 161. The DTMF digits may be received from the ASCP 104, and a circuit switched data call is placed to the RMC 118 over the GSM network. The analog modem in the RMC 118 answers the data call and completes the modem connection with the ASCP 104. The ASCP 104 sends the alarm event message to the RMC 118. The RMC 118 then goes on-hook, and the analog data call may be completed.

Those skilled in the art will appreciate that, in addition to the functions described above, the cradle 602 performs any or all of the functions typically ascribed to such cradle devices, such as battery charging. In certain embodiments, the cradle 602 is adaptable to automatically power up the cellular handset 116 when it is placed in the cradle 602 so that cellular handset 116 is available for wireless mode operation of the intelligent interface 106 (subject to activation of the bypass mechanism). In certain other embodiments, the cradle 602 can detect whether a cellular handset 116 is not properly seated so as to be connected to the communications port. Accordingly, the intelligent interface 106 may be placed in landline mode, and/or an audible or visible alert may emanate from the cradle to notify the user that wireless mode cannot be established. In certain embodiments, the cradle 602 can detect the existence of a viable connection between the cellular handset 116 and the power supply provided by the cradle. If the cellular handset is not receiving power, then the intelligent interface 106 may be placed in landline mode, and/or an audible or visible alert may emanate from the cradle to notify the user. Alternatively, in this situation, the cradle 602 may place the intelligent interface 106 in landline mode only if the level of charge maintained by the cellular handset battery is insufficient to place one or more wireless calls.

Although described with respect to a residential monitored security system, the present invention can be implemented in non-residential environments as well. Furthermore, the present invention is not limited to implementation with cellular handsets; rather, the intelligent interface can be constructed or adapted to interface with any suitable wireless device, including personal digital assistants (PDAs), radio transceivers, wireless modems, and wireless-enabled computing devices. It should be understood that each of the circuits shown in FIGS. 1-7 can be implemented as portions of a suitably programmed general purpose computer. Alternatively, each of the circuits can be implemented as physically distinct hardware circuits within an ASIC (Application Specific Integrated Circuit) chip, or using a programmable logic device (PLD), or using discrete logic elements or discrete circuit elements. The particular form each of the circuits shown in FIGS. 1-7 will take is a design choice and will be obvious and predictable to those skilled in the art.

Another aspect of this invention is to provide a system for transmitting signals from an alarm system control panel to a remote monitoring center. The alarm system control panel includes: an intelligent interface for receiving the signals from the alarm system control panel, and for selectively relaying the signals to the remote monitoring center via either a wireless device or a landline based on the presence of the wireless device. The intelligent interface includes detecting that the wireless device is present via BLUETOOTH; and upon detecting that the wireless device is present, causing the intelligent interface to bypass the landline and to relay the signals to the monitoring center via the wireless device.

Another aspect of this invention is to provide a method for switching a transmission path between an alarm system control panel to a remote monitoring center from a wireless path to a landline path. The method including the steps of detecting that the wireless device is present via BLUETOOTH; and switching the transmission path from a landline to a wireless path based on the detecting step.

This invention may be implemented utilizing a variety of different radio solutions, including for example: Hyperlan, WiMAX, UWB, BLUETOOTH, WiFI, IR, 802.11, various types of non-standardized unlicensed spectrum solutions and any other now known or later developed radio solution. In accordance with systems and methods of this invention, this system may also be implemented with any type of protocol, such as EDGE, TDMA, GSM, FDMA, GPRS, UMTS, WCDMA, OFDM, and/or any other now known or later developed technology.

Additions, deletions, substitutions, and/or modifications can be made to the systems and processes disclosed herein and the elements or embodiments thereof without departing from the spirit and scope of various principles, features, aspects, and advantages of the present invention.

The invention claimed is:

1. A system for reporting alarm events from an alarm control panel that monitors alarm events to a remote monitoring center, comprising:
   an interface that receives signals from the alarm control panel and selectively relays the signals to the remote monitoring center by either: i) a wireless path, or ii) a landline path via a landline connector;
   wherein the interface is configured to select the wireless path without regard to whether the landline path is in an abnormal condition solely in response to the wireless device being associated with the interface via a wireless communications medium, otherwise, the interface is configured to select the landline path; and,
   wherein the interface includes a BLUETOOTH gateway comprising:
      a BLUETOOTH interface that controls the transmission of signals between the alarm control panel and the wireless device;
      an alarm panel agent that communicates information between the alarm control panel and the wireless device;
      a communication port for receiving signals from the alarm control panel;
      a network connector connected to a PSTN network; and
      an analog-to-digital (A/D) signal processor that converts analog signals to digital signals.

2. The system of claim 1, wherein being associated with the interface comprises pairing a wireless transmitter and a wireless receiver, one of which is located in the interface and the other of which is located in the wireless device.

3. The system of claim 1, wherein the wireless device is used as a remote control to send and receive information to and from the remote monitoring center.

4. The system of claim 1, wherein the wireless device is associated with the interface via the wireless communications medium when the wireless device is brought within a predetermined distance of the interface.

5. A method for reporting of alarm events, comprising:
  providing an interface that receives signals from an alarm control panel;
  selectively relaying the signals from the interface to a remote monitoring center through either a wireless path or a landline path via a landline connector;
  wherein selectively relaying comprises selecting the wireless path without regard to whether the landline path is in an abnormal condition for relaying the signals via a wireless device over a wireless network, if the wireless device is associated with the interface via a wireless communications medium, otherwise, relaying the signals over the landline path; and,
  initiating an off hook condition with a communication port associated with a BLUETOOTH gateway device via an alarm control panel;
  cross connecting an analog port of the alarm control port to an A/D processor, wherein the A/D processor simulates a dial tone;
  collecting dual tone multi-frequency (DTMF) digits from an analog modem that is in communication with the alarm control panel;
  signaling the alarm panel agent to setup a BLUETOOTH voice path with the wireless device; and
  completing the voice path with the BLUETOOTH gateway device.

6. The method of claim 5, wherein the wireless device being associated with the interface includes pairing a wireless transmitter and a wireless receiver, one of which is located in the interface and the other of which is located in the wireless device.

7. The method of claim 5, wherein the wireless device is associated with the interface via the wireless communications medium when the wireless device is brought within a predetermined distance of the interface.

* * * * *